(12) United States Patent
Biriuk et al.

(10) Patent No.: US 12,006,076 B2
(45) Date of Patent: Jun. 11, 2024

(54) PACKAGING SYSTEM FOR DRONES

(71) Applicant: Microavia International Limited, Dublin (IE)

(72) Inventors: Ivan Biriuk, Dubai (AE); Denis Kotov, Saint Petersburg (RU)

(73) Assignee: MICROAVIA INTERNATIONAL LIMITED, Dublin (IE)

( * ) Notice: Subject to any disclaimer, the term of this patent is extended or adjusted under 35 U.S.C. 154(b) by 0 days.

(21) Appl. No.: 17/652,357

(22) Filed: Feb. 24, 2022

(65) Prior Publication Data
US 2023/0264833 A1     Aug. 24, 2023

(51) Int. Cl.
*B64U 80/40* (2023.01)
*B64U 80/70* (2023.01)
*B64U 10/13* (2023.01)
*B64U 50/19* (2023.01)

(52) U.S. Cl.
CPC ............ *B64U 80/40* (2023.01); *B64U 80/70* (2023.01); *B64U 10/13* (2023.01); *B64U 50/19* (2023.01)

(58) Field of Classification Search
CPC ................................ B64U 80/40; B64U 80/70
See application file for complete search history.

(56) References Cited

U.S. PATENT DOCUMENTS

| | | |
|---|---|---|
| 9,701,425 B2 | 7/2017 | Lee et al. |
| 11,214,368 B2 | 1/2022 | Augugliaro et al. |
| 2021/0024213 A1* | 1/2021 | Regev ............ B64C 3/38 |
| 2021/0129984 A1* | 5/2021 | Takao ............ B60L 50/60 |
| 2021/0129989 A1* | 5/2021 | Schuett .......... G03B 35/12 |
| 2021/0316859 A1* | 10/2021 | Qiu ............... H01Q 1/28 |

FOREIGN PATENT DOCUMENTS

| | | |
|---|---|---|
| CN | 105863353 A | 8/2016 |
| CN | 106275894 A | 1/2017 |
| CN | 211033716 U | 7/2020 |
| CN | 112061392 A | 12/2020 |
| CN | 212401835 U | 1/2021 |
| CN | 213503500 U | 6/2021 |
| CN | 113844774 A | 12/2021 |
| WO | WO2020/049604 A1 | 3/2020 |

OTHER PUBLICATIONS

European Search Report for European Application No. 22020132 dated Aug. 11, 2022.

* cited by examiner

*Primary Examiner* — Jessica B Wong
(74) *Attorney, Agent, or Firm* — Christian J. Girtz

(57) ABSTRACT

A packaging system for a plurality of drones is disclosed herein. The packaging system is designed for drones, which include a plurality of downward facing propellers and a drone body configured operatively below the plurality of downward facing propellers in a downwardly extending configuration. The packaging system comprises a primary container; and a plurality of secondary containers for holding ten of the drones therein, wherein the secondary containers have dimensions for facilitating accommodation of nine of the secondary containers in the primary container.

4 Claims, 10 Drawing Sheets

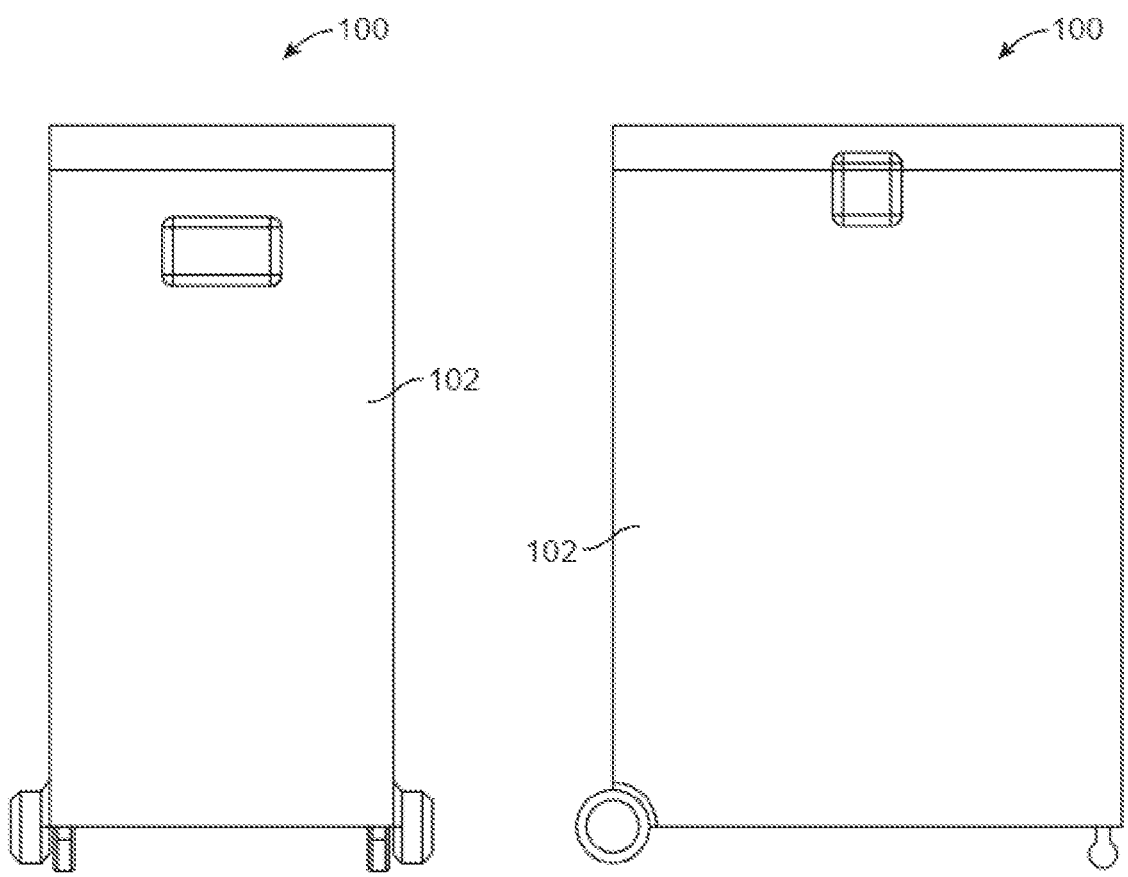

PACKAGING SYSTEM FOR DRONES

FIELD OF THE INVENTION

The present disclosure generally relates to packaging systems, and particularly, but not limitedly, to a packaging system for storing and transporting drones via standard logistic services.

BACKGROUND

A drone show or drone exhibition is an exhibition of drones having light emissions and flying in a coordinated manner for a public display. The drones may be quadcopters flying in synchrony and equipped with LEDs. Drone shows are usually conducted either at night or in controlled lighting indoors.

In a typical drone show, the number of participating drones may number in hundreds or thousands. As such, for a drone show, these large numbers of drones are required to be first and foremost transported to the desired location (location of the drone show). The logistics costs associated with such transportation is directly proportional to the number of the packages or luggage equipment in which the drones are transported. Furthermore, in addition to the number of packages, the size and weight thereof also play an important role in determining the finances involved with such a transportation. If the packages or luggage is classified as oversized by the logistic service provider, its transportation may cost increase exponentially.

One other concerning point with regards to the transportation of drones is reliability of the packages containing the drones. More specifically, protecting the drones from bumps, shaking, and other luggage while transportation is an important parameter to consider since drones are generally fragile because of required weight considerations for flight missions. Yet another important consideration when transporting drones is that the power supplies must be installed in the drones, which also significantly affects the total weight of the luggage. The complete drone show system additionally contains a charger for charging several battery cells and at least one ground control station.

As such, there is a need of a packaging system for transportation of drones and other associated accessories thereof, wherein the packaging system is compact and dimensioned as per the standard luggage size accepted by the logistic service providers.

SUMMARY

Embodiments and technical aspects disclosed herein relate to a packaging system for storing and transporting drones via standard logistic services.

The present subject matter envisages a packaging system for a plurality of drones. The packaging system is designed for drones, which include a plurality of downward facing propellers and a drone body configured operatively below the plurality of downward facing propellers in a downwardly extending configuration. The packaging system comprises a primary container; and a plurality of secondary containers for holding ten of the drones therein, wherein the secondary containers have dimensions for facilitating accommodation of nine of the secondary containers in the primary container.

In a non-limiting alternative embodiment, the primary container has a rectangular shape having a height ranging from 700 mm to 800 mm, a width ranging from 400 mm to 500 mm, and a length ranging from 550 mm to 650 mm.

In a non-limiting alternative embodiment, the secondary container has a rectangular shape having a height ranging from 100 mm to 120 mm, a length ranging from 680 mm to 720 mm, and a width ranging from 140 mm to 180 mm.

In a non-limiting alternative embodiment, the secondary container comprises a plurality of outer walls defining an inner space; a pair of inner walls disposed in the inner space in a spaced apart manner for defining three channels inside the inner space; and a plurality of slots configured on the pair of inner walls, the plurality of slots facilitating placement of the drone body of the drone therein, wherein the drone body is slidable into the slot such that the propellers are placed at one side of the slot and the drone body is placed at an opposite side of the slot.

In a non-limiting alternative embodiment, the plurality of slots includes five slots formed on each of the inner wall for accommodating ten of the drones within the inner space.

In a non-limiting alternative embodiment, the secondary container comprises a plurality of support columns extending in a vertical direction from a floor of the secondary container for supporting the drone body of the drone along a longitudinal axis therefore facilitating secure placement of the drone within the inner space.

The present subject matter envisages a packaging system for battery packs for drones. The packaging system comprises a primary container; and a secondary container for holding the battery packs therein, the secondary container having dimensions for facilitating accommodation of a plurality of the secondary containers in the primary container.

In a non-limiting alternative embodiment, the primary container has a rectangular shape having a height ranging from 700 mm to 800 mm, a width ranging from 400 mm to 500 mm, and a length ranging from 550 mm to 650 mm.

In a non-limiting alternative embodiment, the secondary container has a rectangular shape having a height ranging from 100 mm to 120 mm, a length ranging from 620 mm to 680 mm, and a width ranging from 60 mm to 100 mm.

In a non-limiting alternative embodiment, the secondary container comprises a plurality of outer walls defining an inner space; a plurality of modular battery pack attachments disposed in the inner space and fastened to an inner surface of one of the outer walls, the plurality of modular battery pack attachments holding battery packs therewith.

In a non-limiting alternative embodiment, the plurality of modular battery pack attachments includes engagement formations for coupling to an adjacent modular battery pack attachment for secure placement of the modular battery pack attachments in the inner space.

BRIEF DESCRIPTION OF DRAWINGS

A better understanding of embodiments of the present disclosure (including alternatives and/or variations thereof) may be obtained with reference to the detailed description of the embodiments along with the following drawings, in which:

FIG. 1A thru FIG. 1C illustrates different views of a primary container used in the packaging system, in accordance with an embodiment of the present subject matter.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

Figure 1C:
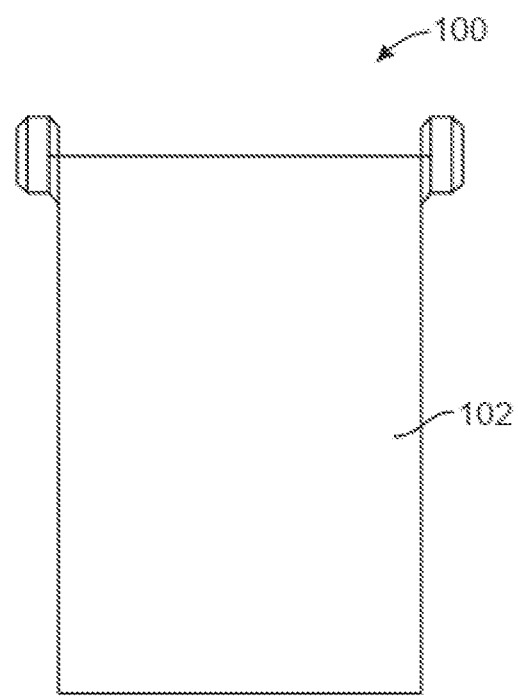

The present subject matter envisages a packaging system 100 for a plurality of drones. The packaging system is designed for drones, which include a plurality of downward facing propellers and a drone body configured operatively below the plurality of downward facing propellers in a downwardly extending configuration. FIG. 1A thru FIG. 1C illustrates different views of a primary container used in the packaging system, in accordance with an embodiment of the present subject matter. Referring to FIG. 1A thru FIG. 1C, the packaging system 100 comprises a primary container 102, and a plurality of secondary containers for holding ten of the drones therein. The secondary containers have dimensions for facilitating accommodation of nine of the secondary containers in the primary container. The explanation regarding the construction and design features of the secondary containers are explained in the subsequent sections of the present disclosure.

Referring back to FIG. 1A thru FIG. 1C, according to a non-limiting embodiment, the primary container 102 has a rectangular shape having a height ranging from 700 mm to 800 mm, a width ranging from 400 mm to 500 mm, and a length ranging from 550 mm to 650 mm. In a preferred embodiment, the primary container 102 has a height of 782 mm, a width of 437 mm, and a length of 572.5 mm. It is to be noted that these dimensions are acceptable by general logistics service providers for the luggage being accepted as normal sized luggage instead of being classified as oversized. As mentioned previously, if the luggage is classified as oversized, it exponentially increases the costs associated with the transportation. The dimensions of the primary container 102, therefore, obviate this disadvantageous aspect of the increased transportation costs of the drones. The primary container 102, in accordance with an embodiment of the present subject matter, may include one or more handles and a plurality of castor wheels for facilitating easy maneuvering thereof.

Figure 2A:
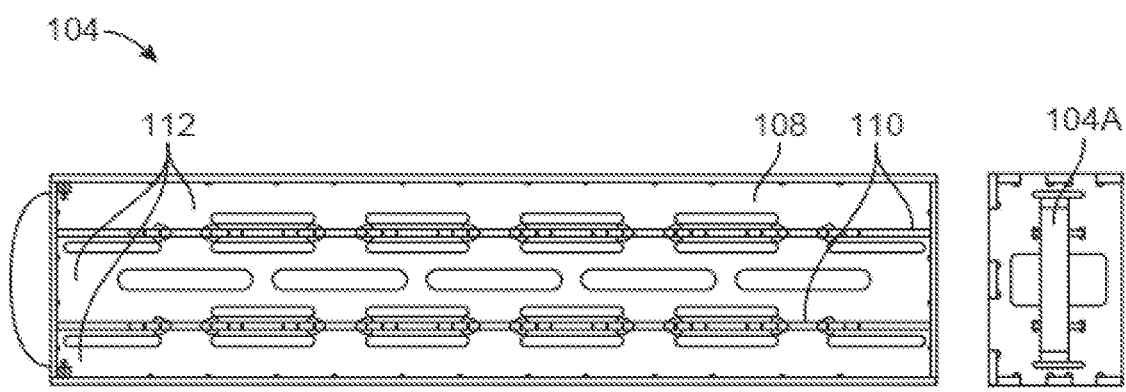
FIG. 2A thru FIG. 2C illustrates different views of a secondary container used in the packaging system, in accordance with an embodiment of the present subject matter.
Figure 2B:
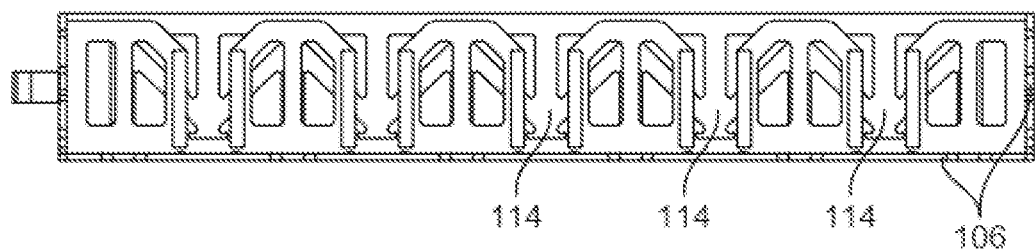
Figure 2C:
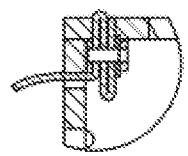
Figure 2D:
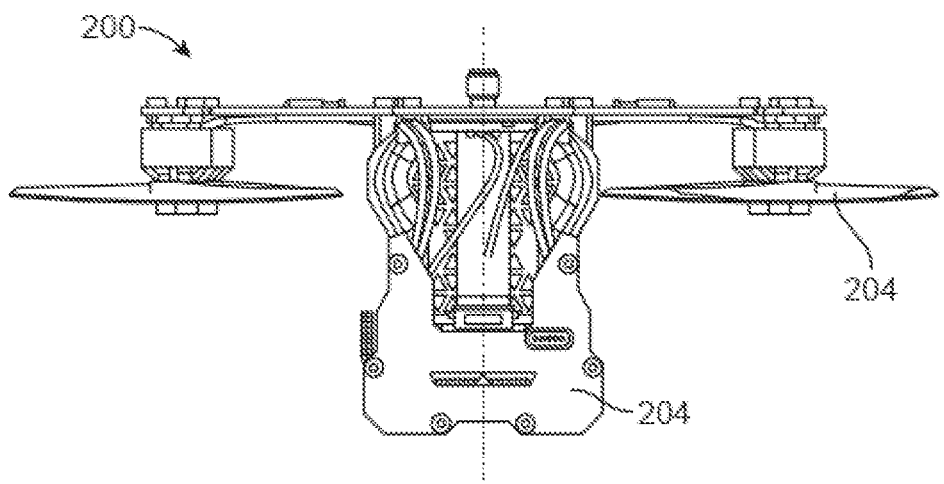
FIG. 2D illustrates a schematic view of an exemplary drone for accommodation of which the secondary container is designed, in accordance with an embodiment of the present subject matter.

FIG. 2A through FIG. 2C illustrate different views of a secondary container 104 used in the packaging system 100, in accordance with an embodiment of the present subject matter. As seen in FIG. 2A thru FIG. 2C, the secondary container 104 is a rectangular container that is open at top. The opening allows the placement of drones inside the secondary container 104. A schematic view of the drone 200 is illustrated in FIG. 2D. As seen in FIG. 2D, the drone 200 includes downward facing propellers 202 and a drone body 204 configured operatively below the downward facing propellers 202 in a downwardly extending configuration. As can be seen in FIG. 2D, the drone 200 has a specific design, which is characterized by propellers facing downwards and a downwardly extending drone body 204. As such, the secondary container 104 is specifically designed for accommodating drones having a configuration similar to that of the drone 200. In a non-limiting alternative embodiment, the secondary container 104 has a rectangular shape.

Referring to FIG. 2A thru FIG. 2C, the secondary container 104 comprises a plurality of outer walls 106 defining an inner space 108. In an embodiment, the outer walls 106 are configured in a rectangular configuration having a height ranging from 100 mm to 120 mm, a length ranging from 680 mm to 720 mm, and a width ranging from 140 mm to 180 mm. In a preferred embodiment, the secondary container 104 has a height of 105 mm, a length of 700 mm, and a width of 164 mm. Such a configuration allows the placement of nine such secondary containers 104 inside of one primary container 102. As is described in the subsequent sections, one such secondary container 104 is configured to accommodate securely therein ten drones. Therefore, the number of drones 200 that can be transported using the system 100, in accordance with the present subject matter, is ninety drones. More specifically, the primary container 102 includes a plurality of rail-sets configured and spaced apart along the length of the primary container 102. As such, three rows of three such secondary containers 104 may be accommodated inside of one primary container 102. Therefore, the advantageous aspect of system 100 is that it can transport 90 drones in a packaging system 100 having compact dimensions that prevents the packaging system 100 from being classified as oversized luggage, thus saving the transportation costs. Furthermore, as will be described in the subsequent sections, the drones 200 are stored within the secondary container 104 in a secure manner that ensures the safety of the drones 200 during transportation. The secondary container 104 also includes a handle 104A for facilitating easy removal of the secondary container 104 from the primary container 102.

Referring back to FIG. 2A thru FIG. 2C, the secondary container 104 includes a pair of inner walls 110 disposed in the inner space 108 in a spaced apart manner for defining three channels 112 inside the inner space 108. A plurality of slots 114 are configured on the pair of inner walls 110 for facilitating placement of the drone body 204 of the drone 200 therein, wherein the drone body 204 is slidable into the slot 114 such that the propellers 202 are placed at one side of the slot 114 and the drone body is placed at an opposite side of the slot 114.

Figure 3A:
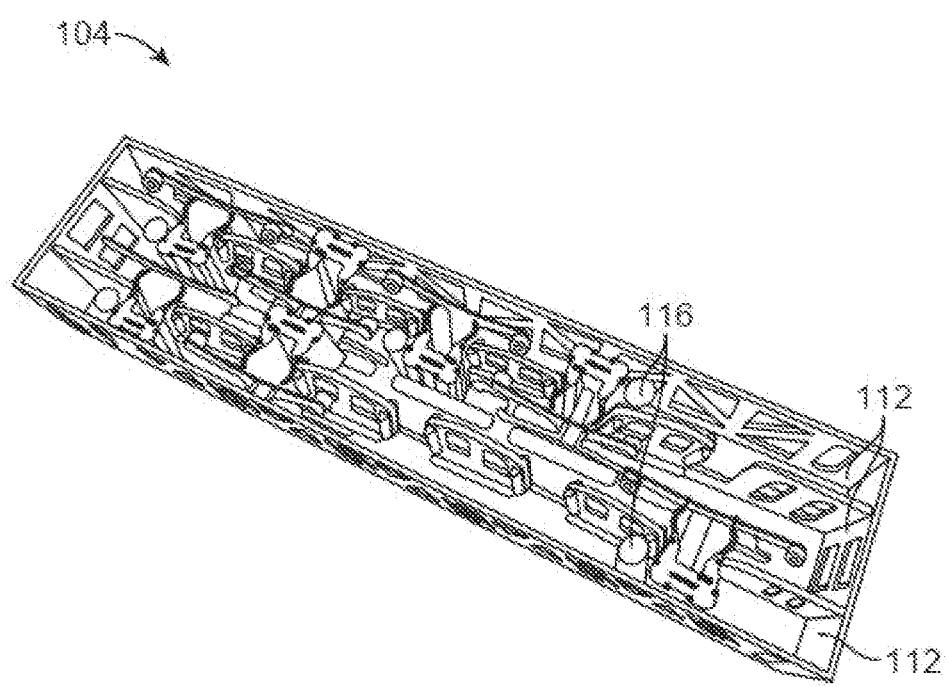
FIG. 3A thru FIG. 3C illustrates photographic views of the secondary container used in the packaging system, in accordance with an embodiment of the present subject matter.
Figure 3B:
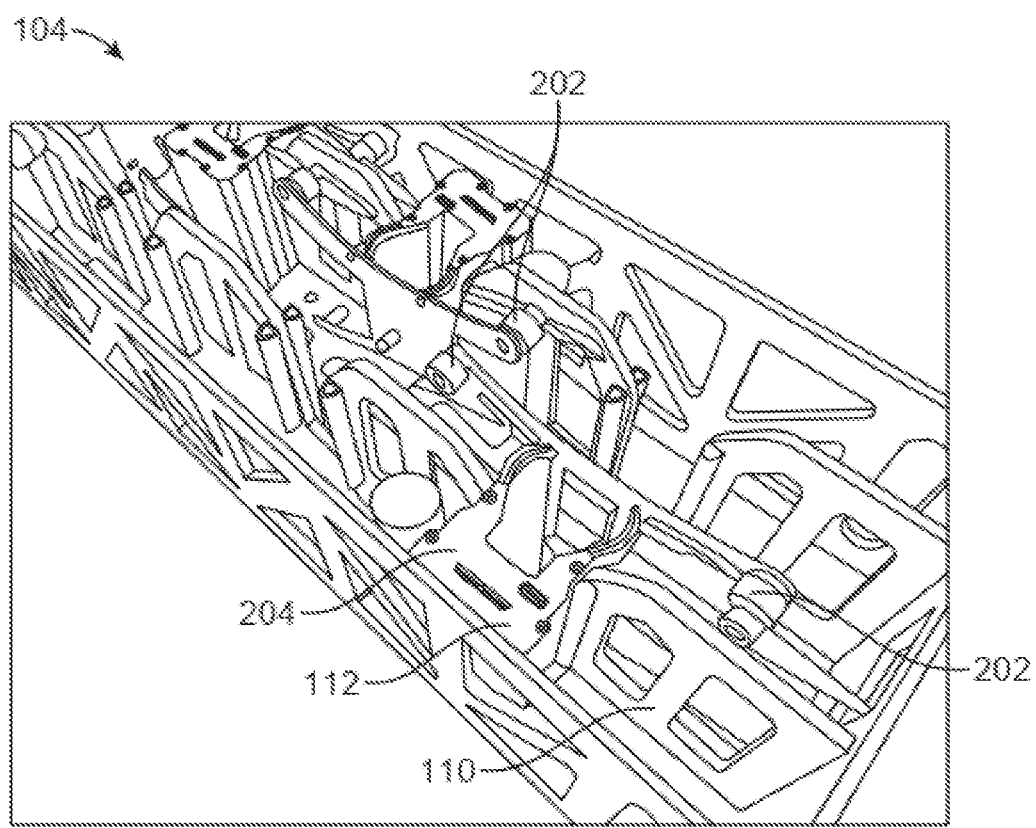
Figure 3C:
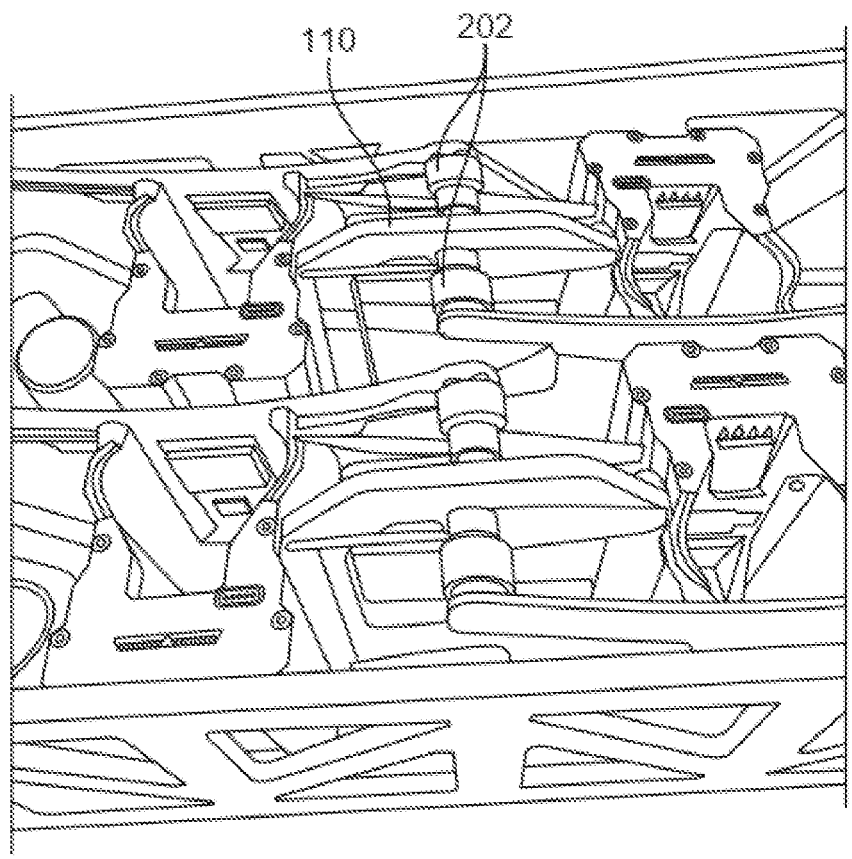

FIG. 3A thru FIG. 3C depicts photographic views of the drones 200 being accommodated inside the secondary container 104. As seen in FIG. 3A thru FIG. 3C, within the three channels 112, two rows of drones 200 may be placed therein. Each inner wall 110 includes five slots 114 configured thereon in a spaced apart configuration. Each slot 114 allows the drone body 204 to be slid therewithin, subsequent to which the drone 200 is held securely within the slot 114. The slots on one inner wall are aligned with the slots configured on the other inner wall. In these aligned slots, drones 200 are placed in the same orientation, i.e., both the drones placed in these aligned slots will have their drone bodies facing the same wall as opposed to facing opposite walls. An advantageous aspect of such a placement is that the propellers 202 of two adjacently placed drones 200 (front placed drone and rear placed drone) in the aligned slots are as far away from each other as possible.

It is to be noted that each inner wall includes 5 slots. Therefore, both the inner walls 110 include 5 pairs of aligned slots (front slots being aligned with rear slots configured on the inner walls). To ensure that the propellers of the drones placed in one pair of aligned slots do not interact with the propellers of other drones placed within the adjacent pair of aligned slots, the drones 200 placed in the adjacent pair of aligned slots have opposite or inverted orientations. Such a placement of drones with opposite orientations within the adjacent aligned slots ensures that the propellers 202 of the drones in the adjacent aligned slots are either facing opposite directions as seen in FIG. 3B or separated by the inner wall 110 as seen in FIG. 3C, while also ensuring optimal utilisation of the inner space 108.

Referring to FIG. 3A and FIG. 3B, the secondary container 104 comprises a plurality of support columns 116 extending in a vertical direction from a floor of the secondary container 104 for supporting the drone body 204 of the drone 200 along a longitudinal axis thereof for facilitating secure placement of the drone 200 within the inner space 108. More specifically, the support columns 116 help limit the lateral movement of the drone 200 during transportation by providing a support or a support surface to the drone body 204 of the drones 200. In one example, the drone 200 may be transported with the battery packs being pre-installed within the drone bodies 204 of the drones 200. This will reduce the downtime associated with readying the drones 200 for a drone-show by assembling the battery packs inside the drone at drone-show location.

Figure 4A:
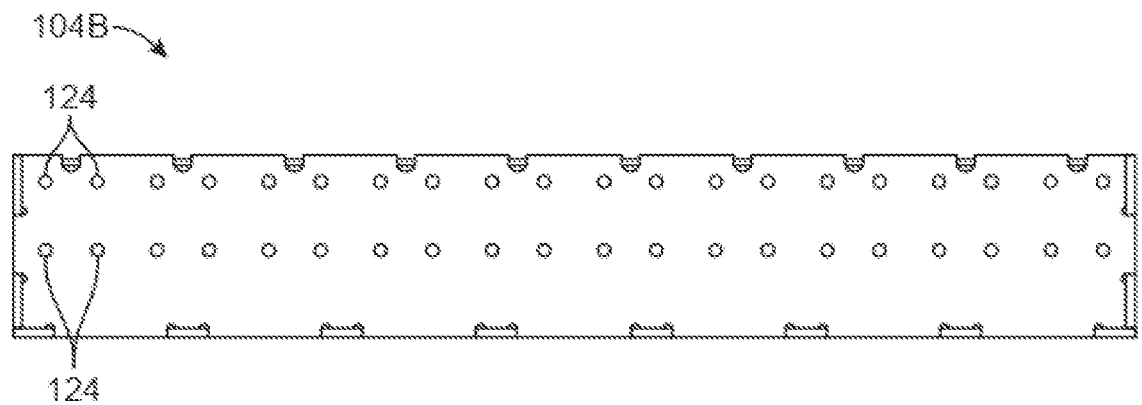
FIG. 4A thru FIG. 4C illustrates different views of a secondary container used in the packaging system, in accordance with another embodiment of the present subject matter.
Figure 4B:
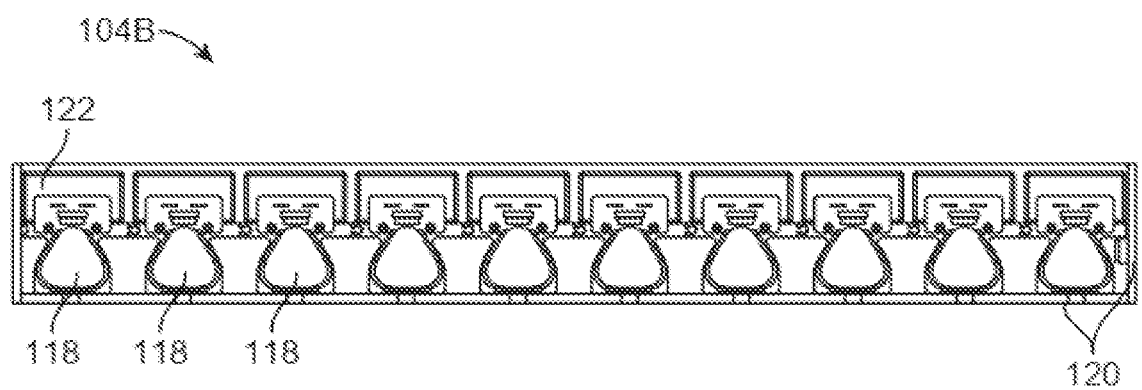
Figure 4C:
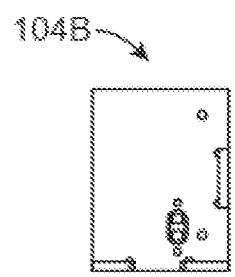

Sometimes, it may be required to just transport the battery packs instead of complete drones. In view of that, the present subject matter also envisages a different embodiment of the secondary container depicted in FIG. 4A thru FIG. 4C specifically designed to contain battery packs attachments 118 therein. The secondary container 104B has a height ranging from 100 mm to 120 mm, a length ranging from 620 mm to 680 mm, and a width ranging from 60 mm to 100 mm. In a preferred embodiment, the secondary container 104B has a height of 104 mm, a length ranging of 654 mm, and a width of 80 mm.

Similar to the secondary container 104, the secondary container 104B comprises a plurality of outer walls 120 defining an inner space 122. A plurality of modular battery pack attachments 118 are disposed in the inner space 122 and fastened to an inner surface of one of the outer walls 120. The plurality of modular battery pack attachments 118 include the battery packs provided therewith.

Figure 5A:
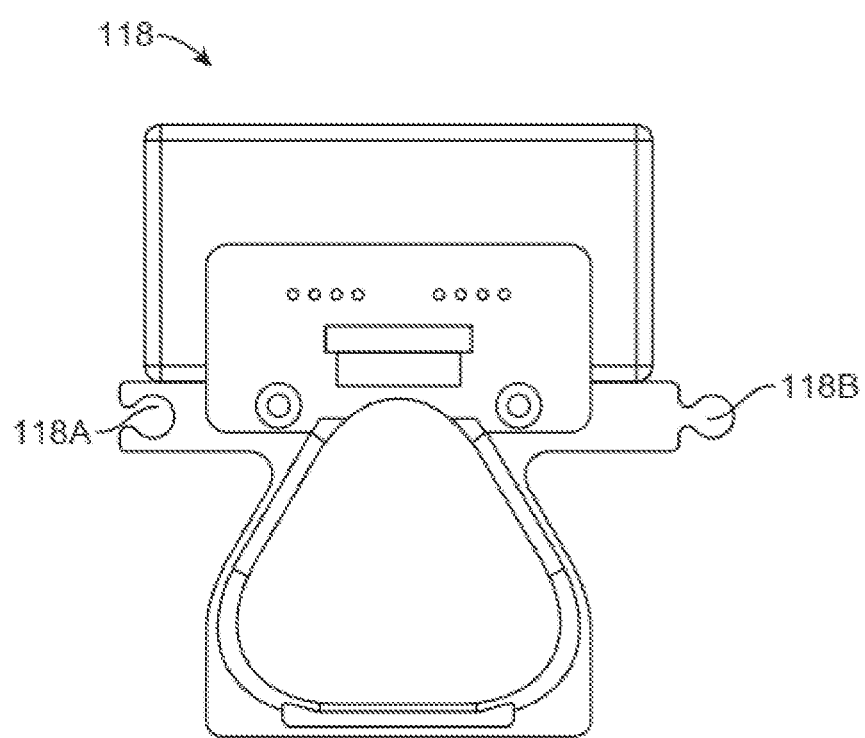
FIG. 5A and FIG. 5B illustrates different views of a battery pack attachment used in the packaging system, in accordance with an embodiment of the present subject matter.
Figure 5B:
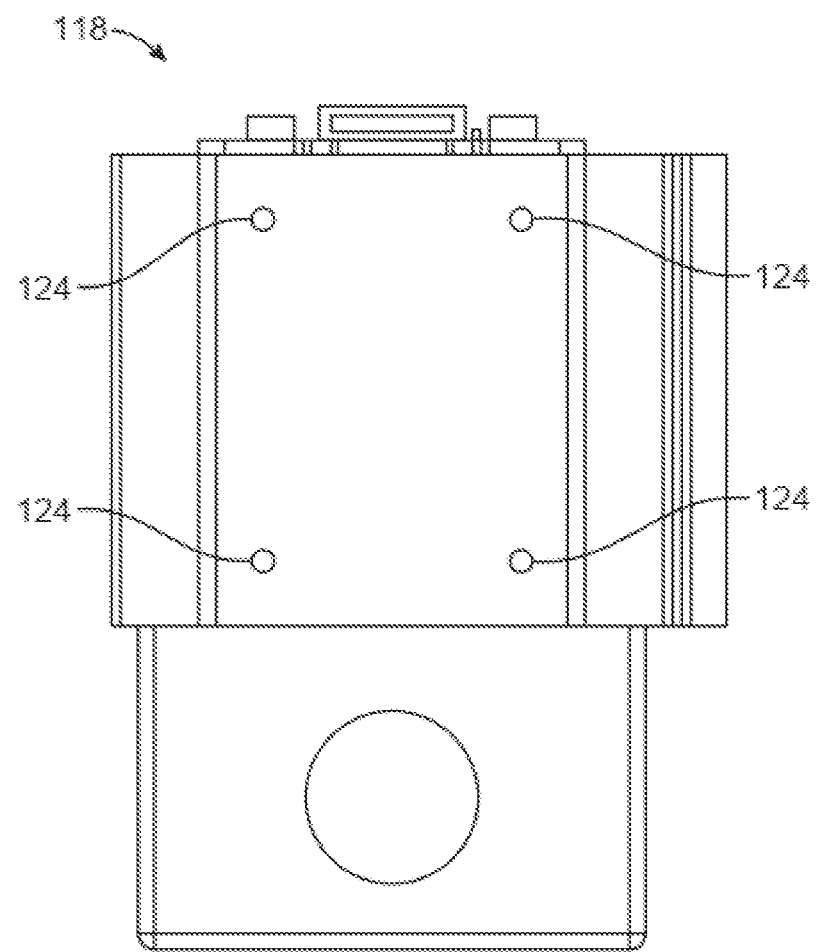

Reference hereinafter is directed to FIG. 5A and FIG. 5B, which illustrate different views of the battery pack attachment 118 used in the packaging system 100. In an embodiment, the plurality of modular battery pack attachments 118 include engagement formations 118A, 118B for coupling to an adjacent modular battery pack attachment 118 for secure placement of the modular battery pack attachments 118 in the inner space 122. More specifically, the modular battery pack attachments 118 are fastened at four locations 124 to one of the walls of the secondary container 104B, while the engagement formations 118A, 118B facilitate another mode of fastening to the modular battery pack attachments 118. The two modes of fastening of the modular battery pack attachments 118 inside the inner space 122 ensure secure placement of the modular battery pack attachments 118 within the secondary container 1048.

Figure 6:
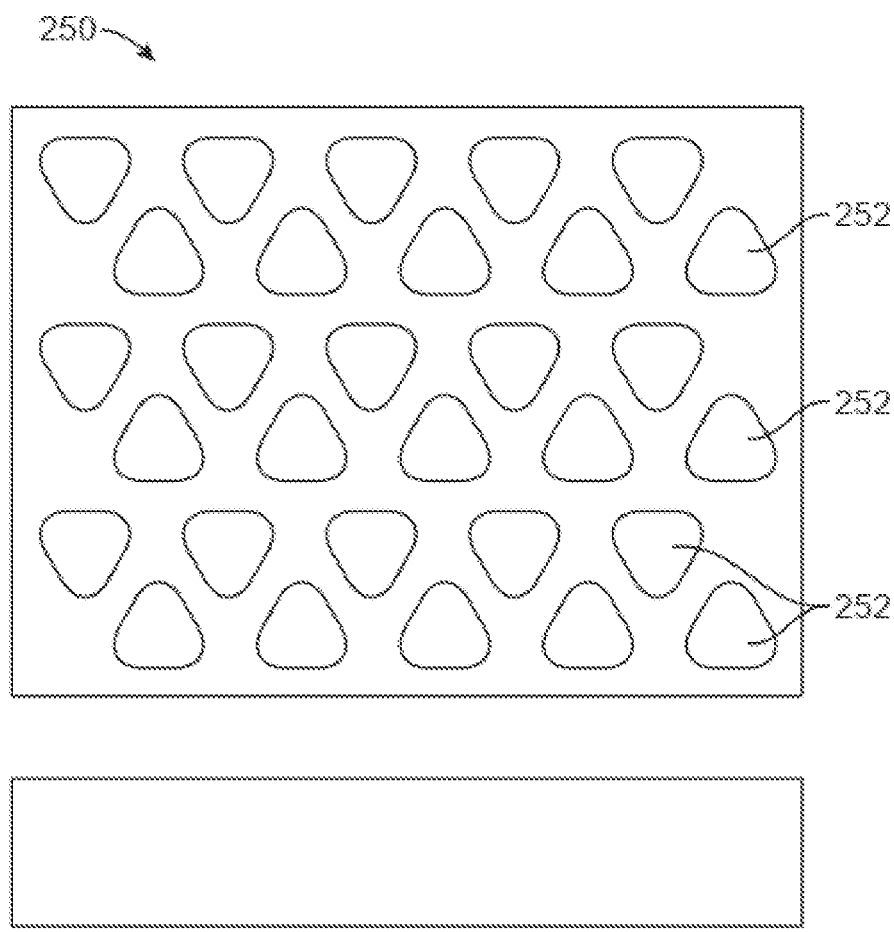
FIG. 6 illustrates a schematic view of a cushion configured for placement inside a secondary container, in accordance with an embodiment of the present subject matter.

In yet another embodiment, to transport the battery packs separately from the drone, a cushion, for example, a foam cushion, is used with cut-outs in the shape corresponding to the cross-section of the battery packs, in which the battery packs are placed. This foam cushion may be placed inside a secondary container, wherein a number of the secondary containers may be placed inside the primary container. FIG. 6 illustrates a schematic view of one such foam cushion 250 having cut-outs 252 and configured for placement inside a secondary container. In accordance with one embodiment, the number of foam cushions 250 for transportation of batteries may range from 18 to 21.

It is to be noted that the drone 200 carried in this packaging system 100 is designed with weight and size considerations to provide the maximum capacity and the maximum possible flight time for the drone 200 from a single charge. In particular, the materials of the drone frame, the location of the boards relative to each other, interference elimination, the choice of battery cells for the drones, and their mounting location in the drone 200 were designed to meet the requirements associated with the maximum capacity and the maximum possible flight time.

The invention claimed is:

1. A packaging system for a plurality of drones, wherein each drone includes a plurality of downward facing propellers and a drone body configured operatively below the plurality of downward facing propellers in a downwardly extending configuration, the packaging system comprising:
   a primary container; and
   a plurality of secondary containers for holding ten of the drones therein, the secondary containers having dimensions for facilitating accommodation of nine of the secondary containers in the primary container of a rectangular shape having, a height ranging, from 100 mm to 120 mm, a length ranging from 680 mm to 720 mm, and a width ranging from 140 mm to 180 mm, each secondary container including:
      a plurality of outer walls defining an inner space,
      a pair of inner walls disposed in the inner space in a spaced apart manner for defining three channels inside the inner space, and
      a plurality of slots configured on the pair of inner walls, the plurality of slots facilitating placement of the drone body of the drone therein, wherein the drone body is slidable into the slot such that the propellers are placed at one side of the slot and the drone body is placed at an opposite side of the slot.

2. The packaging system according to claim 1, wherein the primary container has a rectangular shape having a height ranging from 700 mm to 800 mm, a width ranging from 400 mm to 500 mm, and a length ranging from 550 mm to 650 mm.

3. The packaging system according to claim 1, wherein the plurality of slots includes five slots formed on each of the inner wall for accommodating ten of the drones within the inner space.

4. The packaging system according to claim 1, wherein the secondary container comprises a plurality of support columns extending in a vertical direction from a floor of the secondary container for supporting the drone body of the drone along a longitudinal axis thereof for facilitating secure placement of the drone within the inner space.

* * * * *